United States Patent
Kolhouse et al.

(10) Patent No.: US 10,100,723 B2
(45) Date of Patent: Oct. 16, 2018

(54) DUAL FUEL ARCHITECTURE AND METHOD FOR CYLINDER BANK CUTOUT AND INCREASED GAS SUBSTITUTION DURING LIGHT LOAD CONDITIONS

(71) Applicant: Cummins Inc., Columbus, IN (US)

(72) Inventors: J. Steven Kolhouse, Columbus, IN (US); Timothy P. Lutz, Columbus, IN (US); C. Larry Bruner, Greenwood, IN (US); Christopher Pollitt, Charleston, SC (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/713,047

(22) Filed: Sep. 22, 2017

(65) Prior Publication Data

US 2018/0010515 A1    Jan. 11, 2018

Related U.S. Application Data

(63) Continuation of application No. PCT/US2016/023356, filed on Mar. 21, 2016.

(Continued)

(51) Int. Cl.
  *F02D 19/06*  (2006.01)
  *F02D 41/00*  (2006.01)
  (Continued)

(52) U.S. Cl.
  CPC .............. *F02B 47/10* (2013.01); *F02B 75/22* (2013.01); *F02D 9/04* (2013.01); *F02D 17/02* (2013.01);
  (Continued)

(58) Field of Classification Search
  CPC .... F02B 47/10; F02B 2043/103; F02B 43/12; F02B 75/22; F02D 41/02; F02D 41/0025;
  (Continued)

(56) References Cited

U.S. PATENT DOCUMENTS 5,195,485 A    3/1993   Jensen et al.
6,003,478 A  * 12/1999   Huber .................... F02B 7/06
                                                    123/27 GE (Continued)

FOREIGN PATENT DOCUMENTS

DE    19909658    9/2000
DE    10146063    4/2003

(Continued)

OTHER PUBLICATIONS

International Search Report and Written Opinion, PCT Appln. No. PCT/US2016/023356 dated Jun. 24, 2016.

*Primary Examiner* — Lindsay Low
*Assistant Examiner* — George Jin
(74) *Attorney, Agent, or Firm* — Taft Stettinius & Hollister LLP

(57) ABSTRACT

The present disclosure relates to dual fuel internal combustion engines with multiple cylinder banks and/or cylinder subsets, and exhaust aftertreatment systems associated therewith. Systems and methods are disclosed that relate to engine operations involving fuelling control for fuel cutout of one or more of the cylinder banks and/or cylinder subsets in response to a fuel cutout event to increase gaseous fuel substitution on the other cylinder banks and/or cylinder subsets to satisfy the torque request and thermal management conditions of the aftertreatment system.

20 Claims, 3 Drawing Sheets

Related U.S. Application Data

(60) Provisional application No. 62/138,645, filed on Mar. 26, 2015.

(51) Int. Cl.
| | |
|---|---|
| *F02B 47/10* | (2006.01) |
| *F02D 41/12* | (2006.01) |
| *F02D 9/04* | (2006.01) |
| *F02D 17/02* | (2006.01) |
| *F02D 19/08* | (2006.01) |
| *F02B 75/22* | (2006.01) |
| *F02D 41/02* | (2006.01) |
| *F02B 3/06* | (2006.01) |

(52) U.S. Cl.
CPC ....... *F02D 19/061* (2013.01); *F02D 19/0642* (2013.01); *F02D 19/081* (2013.01); *F02D 41/0025* (2013.01); *F02D 41/0082* (2013.01); *F02D 41/02* (2013.01); *F02D 41/123* (2013.01); *F02B 3/06* (2013.01); *Y02T 10/36* (2013.01)

(58) Field of Classification Search
CPC ............. F02D 41/0082; F02D 41/0027; F02D 41/0087; F02D 19/10; F02D 19/0621; F02D 19/061; F02D 19/0642; F02D 19/0613; F02D 17/02; F02D 17/023; F02D 9/04

See application file for complete search history.

(56) References Cited

U.S. PATENT DOCUMENTS

| | | |
|---|---|---|
| 6,494,179 B1 | 12/2002 | Pantring et al. |
| 6,520,158 B1 | 2/2003 | Mills |
| 7,367,180 B2 | 5/2008 | Surnilla et al. |
| 2007/0068483 A1* | 3/2007 | Kulzer ............... F02B 69/00 123/295 |
| 2014/0069386 A1 | 3/2014 | Coldren et al. |
| 2014/0311451 A1* | 10/2014 | Fang ................ F02M 21/0284 123/445 |
| 2016/0348613 A1* | 12/2016 | Tuexen ............. F02M 21/0221 |
| 2017/0204792 A1* | 7/2017 | Thomas ............ F02D 19/0615 |

FOREIGN PATENT DOCUMENTS

| | | |
|---|---|---|
| DE | 102005043665 | 3/2007 |
| EP | 2921675 | 4/2003 |
| WO | 2014076995 | 5/2014 |

* cited by examiner

DUAL FUEL ARCHITECTURE AND METHOD FOR CYLINDER BANK CUTOUT AND INCREASED GAS SUBSTITUTION DURING LIGHT LOAD CONDITIONS

CROSS-REFERENCE TO RELATED APPLICATIONS

The present application is a continuation of International Patent App. No. PCT/US2016/023356 filed on Mar. 21, 2016, claims priority to and the benefit of the filing date of U.S. Provisional Application Ser. No. 62/138,645 filed on Mar. 26, 2015, each of which is incorporated herein by reference in its entirety.

BACKGROUND

The present application relates to dual fuel engines and controls for dual fuel engines, and more particularly, but not exclusively, to dual fuel engines with multiple cylinder banks and controls using cylinder bank fuelling cutout to increase gaseous fueling substitution under certain operating conditions.

Dual fuel engines have been developed to enable the use of gaseous fuel as a substitute for a liquid fuel, such as diesel fuel, under certain operating conditions. The gaseous fuel is typically lower in cost and readily available in applications where such engines are employed. In order to take advantage of the lower cost gaseous fuel, it is desirable to maximize the substitution rate of gaseous fuel for liquid fuel when operating conditions permit. However, various engine operating requirements dictate that a certain amount of liquid fuel be employed during operation. For example, injectors typically require a threshold amount of liquid fuel to be injected to maintain injector tip temperature below acceptable limits. In addition, a certain amount of liquid fuel is required to ignite the gaseous fuel. Thus, under light load or part load conditions encountered during light duty cycles, high substitution rates of gaseous fuel are not able to be achieved. In addition, exhaust aftertreatment system temperatures are required to be maintained above certain thresholds to enable effective operation of the aftertreatment components. Under light or part load conditions, minimum required fuelling to the cylinders may need to be increased above that required to meet demand torque in order to satisfy aftertreatment temperature requirements. Therefore, further improvements in this technology area are needed for exhaust aftertreatment system thermal management and/or to achieve greater substitution rates of gaseous fuel for liquid fuel in dual fuel engines under light or part load conditions.

SUMMARY

For the purposes of clearly, concisely and exactly summarizing and describing in detail illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

One exemplary embodiment is a method of controlling a dual fuel internal combustion engine system including at least two cylinder banks each including at least one cylinder structured to selectably receive liquid fuel and gaseous fuel from a fuel system. The method comprises operating the engine system in a dual fuel mode in which the two cylinder banks receive and combust liquid fuel and gaseous fuel, evaluating whether to initiate a fuel cutout for a targeted cylinder bank of the two cylinder banks, in response to the evaluating, commanding shutoff of a gaseous fuel supply to the targeted cylinder bank, and subsequently continuing to provide liquid fuel the targeted cylinder bank until a gaseous fuel ventilation criterion is satisfied, and after satisfaction of the gaseous fuel ventilation criterion, ending liquid fuelling of the targeted cylinder bank and contemporaneously maintaining dual fuel combustion by the non-targeted cylinder bank to satisfy a output demand of the engine. Further embodiments, forms, objects, features, advantages, aspects, and benefits shall become apparent from the following description and drawings.

DETAILED DESCRIPTION OF ILLUSTRATIVE EMBODIMENTS

Figure 1:
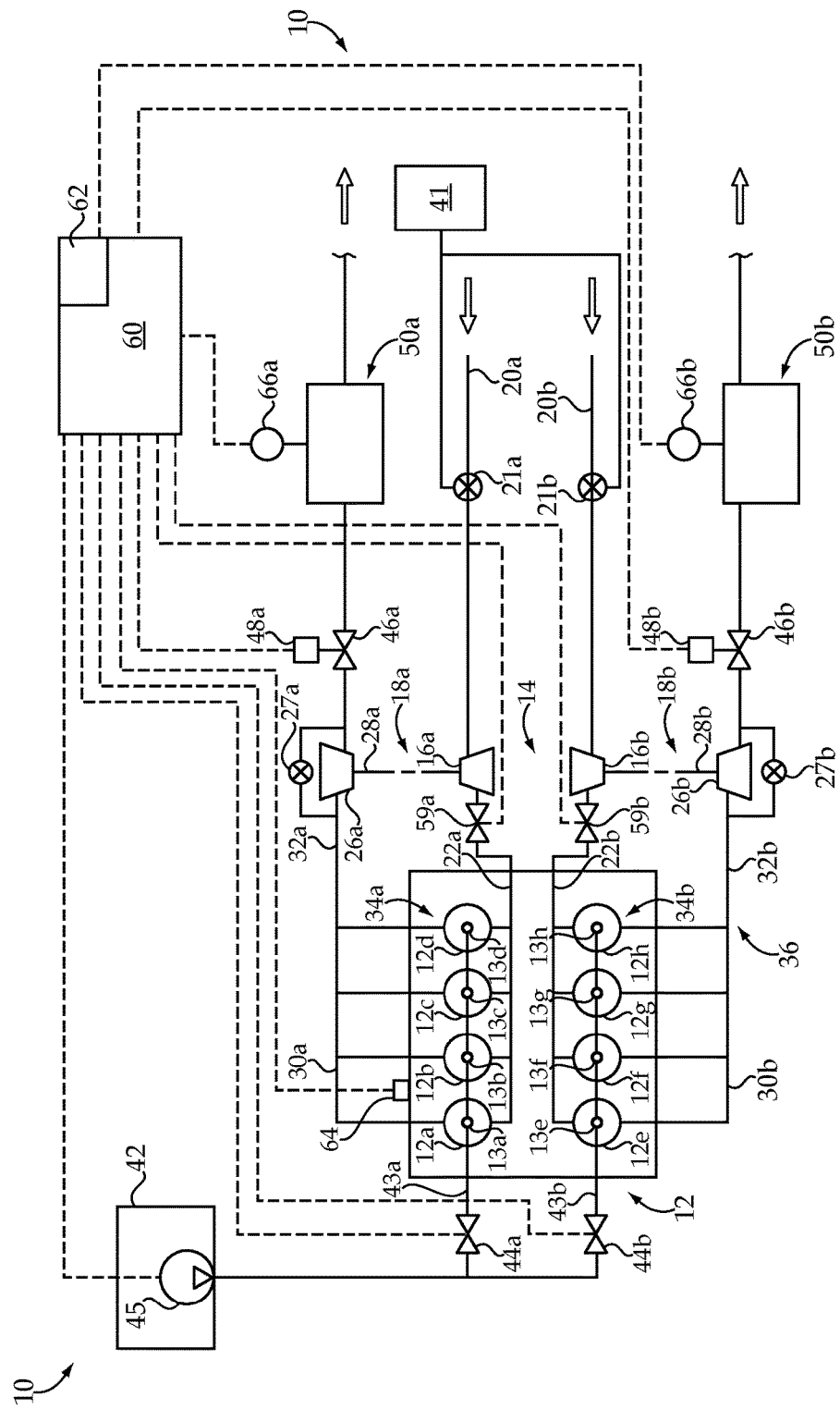
FIG. 1 is a schematic diagram illustrating certain aspects of an exemplary dual fuel engine system.

FIG. 1 shows an internal combustion engine system 10 according to one embodiment of the present application. System 10 includes an internal combustion engine 12 having an intake system 14 and an exhaust system 36. Engine 12 can be any type of engine, and in one specific embodiment is a dual fuel engine that includes a number of cylinders housing a number of pistons and combusts one or both of a gaseous fuel and a liquid fuel provided to each of the cylinders to produce an exhaust gas from each of the cylinders. In the illustrated embodiment, engine 12 includes first and second cylinder banks 34a, 34b each connected with its own respective exhaust aftertreatment system via an exhaust flow path. Engine 12 can be V-type engine with two cylinder banks disposed at an angle relative to one another, although other embodiments include in-line cylinder arrangements, a W-type engine, or any other engine arrangement with more than one cylinder and with at least two subsets of cylinders referred to herein as cylinder banks or banks of cylinders.

In the illustrated embodiment, engine 12 includes a first intake manifold 22a fluidly coupled to an outlet of a first compressor 16a of a first turbocharger 18a fluidly coupled with a first intake conduit 20a, and a second intake manifold 22b fluidly coupled to an outlet of a second compressor 16b of a second turbocharger 18b fluidly coupled with a second intake conduit 20b. First intake conduit 20a includes a first gas control valve 21a upstream of compressor 16a connected to a gaseous fuel source 41. Second intake conduit 20b includes a second gas control valve 21b upstream of compressor 16b connected to gaseous fuel source 41. Compressor 16a includes a compressor inlet coupled to first intake conduit 20a for receiving fresh air from an air inlet and compressor 16b includes a compressor inlet coupled to second intake conduit 20b for receiving fresh air from an air inlet. Intake conduits 20a, 20b can have separate inlets or can receive air from a common inlet. System 10 may also include intake throttles 59a, 59b disposed in line with respective ones of the intake conduits 20a, 20b between compressors 16a, 16b and intake manifolds 22a, 22b. Optionally, system 10 may include an intake air cooler (not shown) disposed in line with each of the intake conduits 20a, 20b between compressor 16a, 16b and intake manifold 14a, 14b.

Each of the turbocharger compressors 16a, 16b is mechanically coupled to a respective one of the turbocharger turbines 26a, 26b via a corresponding drive shaft 28a, 28b. Turbine 26a includes a turbine inlet fluidly coupled to an exhaust manifold 30a of engine 12 via an exhaust conduit 32a, and turbine 26b includes a turbine inlet fluidly coupled to an exhaust manifold 30b of engine 12 via an exhaust conduit 32b. Turbine 26a can include a wastegate 27a, and turbine 26b can include a wastegate 27b. Collectively, conduit 20a, intake manifold 22a, first cylinder bank 34a, exhaust manifold 30a, and exhaust conduit 32a define a first pathway along which gas flows from compressor 16a to turbine 26a during operation of first cylinder bank 34a of engine 12. Collectively, conduit 20b, intake manifold 22b, cylinder bank 34b, exhaust manifold 30b, and exhaust conduit 32b define a second pathway along which gas flows from compressor 16b to turbine 26b during operation of second cylinder bank 34b of engine 12.

In the illustrated embodiment, engine 12 is of a reciprocating piston type with four stroke operation, and runs on a liquid fuel, such as diesel fuel, received by direct or port injection with compression ignition and, in certain operating conditions, gaseous fuel from second fuel source 41 that is substituted for a portion of the liquid fuel to meet demand torque or a torque request to engine 12. More specifically, as schematically represented in FIG. 1, engine 12 includes, for purposes of illustration and not limitation, eight pistons that are disposed in cylinders 12a-12h, respectively. The pistons are each connected to a crankshaft by a corresponding connecting rod to reciprocally move within the respective cylinder 12a-12h in a standard manner for four stroke engine operation. Each cylinder 12a-12h includes a combustion chamber with appropriate intake and exhaust valves that are opened and closed via a camshaft and fuel injectors 13a-13h, respectively, for injecting liquid fuel. Fuel injectors 13a-13h are of a standard type that operate in response to signals from electronic controls described in greater detail herein.

Fuel injectors 13a-13h receive fuel from a fuel system 40 that includes a liquid fuel source 42 in fluid communication therewith. Liquid fuel source 42 can be connected with a fuel pump 45 that provides a flow of liquid fuel to cylinders 12a-12h in response to a fuelling command from a controller 60. Fuel injectors 13a-13h can be direct injectors as shown, port injectors, or both. Additionally, gaseous fuel can be provided at any suitable location along intake system 14 from a gaseous fuel source 41 by fuelling commands that control gas control valves 21a, 21b. In the illustrated embodiment, cylinders 12a-12d of cylinder bank 34a can receive liquid fuel from a first common rail 43a and gaseous fuel from intake conduit 20a, and cylinders 12e-12h can receive liquid fuel from a second common rail 43b and gaseous fuel from second intake conduit 20b. Separate fuel control valves 44a, 44b can be provided for each of the cylinders banks 34a, 34b so that the liquid fuelling can be controlled separately to each cylinder bank 34a, 34b via a cylinder bank liquid fuelling command from controller 60. Separate gas control valves 21a, 21b can be provided for each of the cylinders banks 34a, 34b so that the gaseous fuelling can be controlled separately to each cylinder bank 34a, 34b via a cylinder bank gaseous fuelling command from controller 60. Alternatively or additionally, each of the injectors 13a-13h can be separately controlled via fuelling commands from controller 60 to selectively admit fuel to the respective cylinder 12a-12h. In addition, each of the cylinders 12a-12h may be connected to a same common rail, or a common rail is omitted altogether. Any type of liquid fuel and gaseous fuel suitable for dual fuel engine operations are contemplated.

System 10 further includes a first exhaust throttle 46a in exhaust conduit 32a downstream of turbine 26a, and a second exhaust throttle 46b in exhaust conduit 32b downstream of turbine 26b. In the illustrated embodiment, exhaust throttles 46a, 46b are downstream of the respective turbine 26a, 26b. Alternatively, the exhaust throttle can be upstream of the turbine. In another embodiment, a multi-stage turbocharger is provided and the exhaust throttle is located between the turbines of the turbine stages. In still other embodiments, an exhaust throttle is omitted.

First exhaust throttle 46a and second exhaust throttle 46b each include an actuator 48a, 48b, respectively, that are operably connected to controller 60 to receive control signals that actuate exhaust throttles 46a, 46b between on-off or open-closed positions in response to operating parameters of engine 12 and the exhaust system 36 to provide thermal management of the corresponding aftertreatment systems 50a, 50b connected to the respective exhaust conduit 32a, 32b. Exhaust throttles 46a, 46b can include any suitable valve member in the exhaust flow path that is actuatable between two positions, such as an open/on position, and a closed/off position. The valve members of exhaust throttles 46a, 46b can be, for example, a butterfly type valve, a guillotine-type valve, or a ball-type valve. In one embodiment, the flow restricting portion of the valve includes a passage so that when the valve is closed or off, a minimum exhaust flow is permitted to pass therethrough that is set at a targeted low load condition of engine 12. Actuators 48a, 48b can be an electronic actuator, an electric motor, a pneumatic actuator, or any other suitable type of actuator to operate the valve member of the respective exhaust throttle 46a, 46b. In another embodiment, intake throttles 59a, 59b can include actuators that are operably connected to controller 60 to receive control signals that actuate the intake throttles 59a, 59b between on-off or open-closed positions in response to operating parameters of engine 12 and the exhaust system 36 to provide thermal management of the corresponding aftertreatment systems 50a, 50b connected to the respective exhaust conduit 32a, 32b. Gas control valves 21a, 21b can also include actuators operably connected to controller 60 that are controllable to regulate the gaseous fuel flow to the respective cylinder bank 34a, 34b.

Each aftertreatment system 50a, 50b can include a number of devices in its respective exhaust flow path to chemically convert and/or remove undesirable constituents from the exhaust stream before discharge into the environment. In one specific embodiment, one or both of exhaust aftertreatment systems 50a, 50b may include an oxidation catalyst which is in fluid communication with exhaust flow path via exhaust conduit 32a, 32b and is operable to catalyze oxidation of one or more compounds in the exhaust flowing through the exhaust flow path such as, for example, oxidation of unburned hydrocarbons or oxidation of NO to $NO_2$. In another embodiment, exhaust aftertreatment systems 50a, 50b may further include a diesel particulate filter in fluid communication with the exhaust flow path and operable to reduce the level of particulates in exhaust flowing through exhaust conduit 32a, 32b.

Exhaust aftertreatment system 50a, 50b may include a reductant injector and an SCR catalyst. The reductant injector is supplied with reductant from a reductant reservoir and is operable to inject reductant into the exhaust gas in exhaust conduit 32a, 32b. In an exemplary embodiment the reductant is an aqueous solution of urea which decomposes to provide ammonia. Other embodiments utilize different reductants, for example, aqueous solutions of ammonia, anhydrous ammonia, or other reductants suitable for SCR treatment. Reductant injected into exhaust flow path is provided to the SCR catalyst which is in flow communication with exhaust conduit 32a, 32b and is operable to catalyze the reduction of NOR. The SCR catalyst can be of any type of SCR catalyst known in the art. Exhaust aftertreatment system 50a, 50b may further include a hydrocarbon (HC) injector which is supplied with HC from an HC reservoir such as fuel source 42 or a secondary source (not shown) and is operationally coupled to the exhaust stream at a position upstream of an oxidation catalyst. Other embodiments contemplate an HC injector is omitted and hydrocarbons are added by the fuel system or any other suitable means known in the art, such as by late post-combustion fuel injection into one or more of the cylinders 12a-12h. Embodiments may also include an ammonia oxidation (AMOX) catalyst (not shown) at a position downstream of the SCR catalyst, which is operable to catalyze the reaction of $NH_3$ which slips past the SCR catalyst.

The reactions that take place in an ammonia based aftertreatment system 50a, 50b are in part temperature dependent. An effective temperature range for an ammonia based SCR system depends on the various fuels, gas constituents, $NO:NO_2$ ratio, catalyst composition and catalyst geometry of the system. Operating outside of the temperature range for these reactions may reduce efficiency of any one or multiple reactions thereby reducing the efficiency of the system. A less efficient system may result in an unacceptable level of various components in the exhaust. In addition, one or more components of the aftertreatment systems 50a, 50b may require periodic regeneration, which requires exhaust temperatures at the upper end of or above nominal exhaust system operating temperatures, to remove contaminants and restore performance. The systems and methods disclosed herein provide for effective and efficient thermal management of aftertreatment systems 50a, 50b to operate at a target temperature condition, and therefore lessen emissions impact of the system when temperature excursions occur below certain temperature thresholds and/or temperature increases are needed to respond to a fuel cutout event such as could occur during a low or light load operating condition.

System 10 includes controller 60 that is generally operable to control and manage operational aspects of engine 12, fuel system 40, exhaust throttles 46a, 46b, and/or intake throttles 59a, 59b. Controller 60 includes a memory 62 as well as a number of inputs and outputs for interfacing with various sensors, actuators and other components coupled to engine 12, fuel system 40, injectors 13a-13h, fuel control valves 21a, 21b, exhaust throttles 46a, 46b, intake throttles 59a, 59b, and aftertreatment systems 50a, 50b. Controller 60 can be an electronic circuit device comprised of one or more components, including digital circuitry, analog circuitry, or both. Controller 60 may be of a software and/or firmware programmable type; a hardwired, dedicated state machine; or a combination of these. In one embodiment, controller 60 is of a programmable microcontroller solid-state integrated circuit type that includes memory 62 and one or more central processing units. Memory 62 can be comprised of one or more components and can be of any volatile or nonvolatile type, including the solid-state variety, the optical media variety, the magnetic variety, a combination of these, or such different arrangement as would occur to those skilled in the art. Controller 60 can include signal conditioners, signal format converters (such as analog-to-digital and digital-to-analog converters), limiters, clamps, filters, and the like as needed to perform various control and regulation operations described herein. Controller 60, in one embodiment, may be of a type sometimes referred to as an electronic or engine control module (ECM), electronic or engine control unit (ECU) or the like, that is directed to the regulation and control of overall engine operations. Alternatively, controller 60 may be dedicated to control of just the operations described herein or to a subset of controlled aspects of system 10. In any case, controller 60 preferably includes one or more control algorithms defined by operating logic in the form of instructions provided in a non-transitory computer-readable medium. These algorithms will be described in greater detail hereinafter, for controlling operation of various aspects of system 10.

Controller 60 includes a number of inputs for receiving signals from various sensors or sensing systems associated with elements of system 10. While various sensor and sensor inputs are discussed herein, it should be understood that other sensor and sensor inputs are also contemplated. Furthermore, one or more sensors and sensor inputs discussed herein may not be required. The operative interconnections of controller 60 and elements of system 10 may be implemented in a variety of forms, for example, through input/output interfaces coupled via wiring harnesses, a datalink, a hardwire or wireless network and/or a lookup from a memory location. In other instances all or a portion of the operative interconnection between controller 60 and an element of system 10 may be virtual. For example, a virtual input indicative of an operating parameter may be provided by a model implemented by controller 60 or by another controller which models an operating parameter based upon other information.

System 10 includes an engine speed sensor 64 electrically connected to an engine speed input of controller 60 via a signal path. Engine speed sensor 64 is operable to sense rotational speed of the engine 12 and produce an engine speed signal on the signal path indicative of engine rotational speed. In one embodiment, sensor 64 is a Hall effect sensor operable to determine engine speed by sensing passage thereby of a number of equi-angularly spaced teeth formed on a gear or tone wheel. Alternatively, engine speed sensor 64 may be any other known sensor operable as just described including, but not limited to, a variable reductance sensor or the like. In certain embodiments, system 10 includes an engine position sensor that detects a current position of the crankshaft.

System 10 may further include various sensors not shown, such as intake manifold temperature sensors disposed in fluid communication with the intake manifolds 22a, 22b of engine 12. Intake manifold temperature sensors are operable to produce a temperature signal indicative of the temperature of air charge flowing into the intake manifolds 22a, 22b. System 10 may further include an intake manifold pressure sensor disposed in fluid communication with intake manifolds 22a, 22b operable to produce a pressure signal indicative of air pressure within intake manifold 22a, 22b. System 10 may also include exhaust manifold pressure sensors disposed in fluid communication with exhaust manifolds 30a, 30b that are operable to produce pressure signal indicative of gas pressure within exhaust manifolds 30a, 30b.

Other control mechanisms included within system 10 include electronically controllable flow control valves 44a, 44b and/or fuel pump 45 of fuel system 40. Controller 60 is operable to control flow control valves 44a, 44b, and/or fuel pump 45, and/or injectors 13a-13h, to control the amount and timing of liquid fuel to cylinders 12a-12h and/or to cylinder banks 34a, 34b. Controller 60 is also operable to control gas control valves 21a, 21b to control the amount and timing of gaseous fuel to the respective cylinder banks 34a, 34b. Furthermore, controller 60 can direct the withholding of liquid fuel from one or more of cylinders 12a-12h by controlling injectors 13a-13h and/or the withholding of gaseous fuel to one or more targeted cylinder banks 34a, 34b for a desired period of time by controlling gas control valves 21a, 21b. As discussed further below, controller 60 is operable to cut fuelling to one or more targeted cylinder banks 34a, 34b while fuelling at least one of the other cylinders banks 34a, 34b with liquid and gaseous fuel to satisfy a torque request to engine 12 and produce an exhaust gas flow that provides desired thermal management conditions for the aftertreatment system 50a, 50b of the fuelled cylinder bank 34a, 34b.

In one embodiment, controller 60 is operable to identify a cylinder bank fuel cutout event during operation of engine 12 and issue commands to the various actuators to discontinue both gaseous and diesel fueling for one of the cylinder banks 34a, 34b of firing cylinders 12. Controller 60 recognizes a cylinder bank fuel cutout event based on one or more of a need, value, or opportunity to eliminate fuelling of one or more of the cylinder banks 34a, 34b and enter a cylinder bank fuel cutout mode based on, for example, aftertreatment temperatures and/or engine operating conditions. Controller 60 then issues a gaseous fuel cutout command to close the gas control valve 21a, 21b associated with the targeted cylinder bank 34a, 34b. As the gaseous fuel supply diminishes, the liquid fuel injectors 13a-13h associated with the targeted cylinder bank 34a, 34b will continue supplying liquid fuel in order to maintain engine operating conditions for the targeted bank of cylinders 34a, 34b for a period of time sufficient to allow for the purging/ventilation of any residual gaseous fuel in the associated intake manifold 22a, 22b. The liquid fueling amount would then be reduced to zero within the cylinders 12 of the targeted cylinder bank 34a, 34b after the period of time, along with a corresponding increase of gaseous fuelling in the operating cylinder bank 34a, 34b to meet the torque request to engine 12 no longer being met by the targeted cylinder bank 34a, 34b. With the targeted cylinder bank 34a, 34b disabled, controller 60 can further be configured to issue a command to close an intake throttle, open a wastegate, and/or utilize variable valve actuation to limit the airflow through the exhaust system and/or increase engine pumping work/load to increase or maintain aftertreatment system temperatures of either cylinder bank 34a, 34b above a threshold.

The cylinder bank fuel cutout enables higher gas substitution rates in the fuelled cylinder bank(s) at light and/or part-load conditions. In dual fuel engines, there is a minimum quantity of diesel fuel injection required for cooling to maintain injector tip temperatures. When a cylinder bank is cutout, fuelling with liquid fuel to that cylinder bank in any amount is eliminated, and the increased output torque required from the fuelled cylinder bank(s) to compensate for the cutout cylinder bank can be met with gaseous fuel, and the minimum required liquid fuelling for operation of the targeted cylinder bank is eliminated. In addition, under light or part load conditions, there is a point at which liquid fuel only is used because the injection amounts for dual fuel operation would be too small to reliably ignite the gaseous fuel. By providing a fuelling cutout of one or more cylinder banks, liquid fuel injection quantities in the remaining cylinder banks can be high enough to maintain reliable ignition, enabling gaseous fuel substitution for light loads in which liquid fuelling-only operational requirements were previously sufficient to meet the torque request. In addition, higher exhaust gas temperatures under light-load or part-load engine conditions can be obtained due to higher fueling rates in operable the cylinder banks. This may be used to maintain a minimum or desired temperature for an aftertreatment system coupled with one cylinder bank that would not otherwise be realized while ending fueling to another cylinder bank effective to eliminate or suspend temperature requirements. This also provides a faster exhaust warm-up under cold start conditions. Furthermore, increased gas substitution under light-load or part-load conditions is obtained due to reduced overall (i.e. total) minimum diesel injection requirements resulting from disabling the liquid fuel injectors of the targeted cylinder bank.

Figure 2:
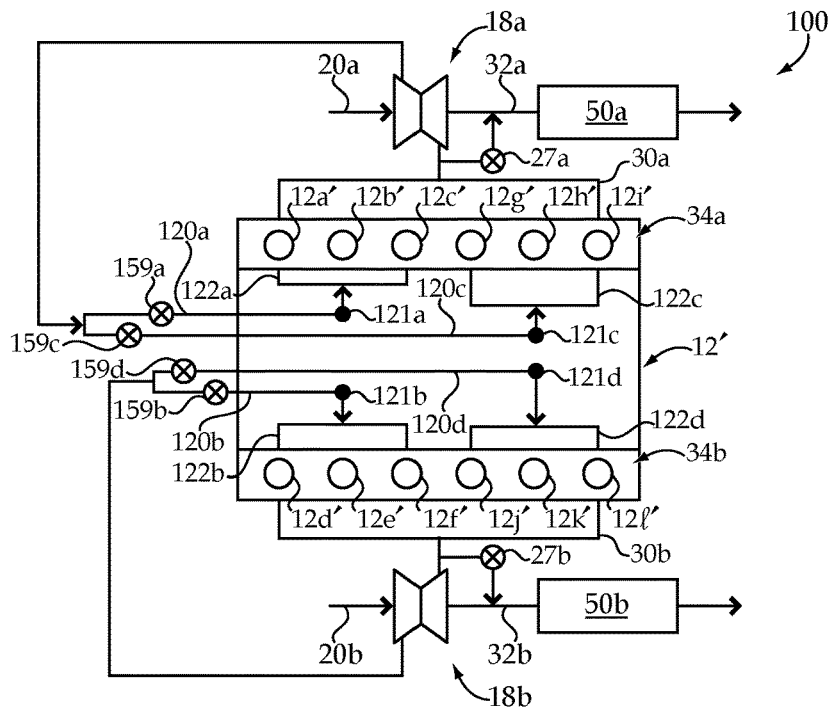
FIG. 2 is a schematic diagram illustrating certain aspects of another exemplary dual fuel engine system.

Referring to FIG. 2, another embodiment dual fuel internal combustion engine system 100 is shown that is similar to system 10 of FIG. 1, and like components are designated with like reference numerals. In addition, certain details of system 10 are omitted in FIG. 2, such as the direct injectors 13a-13h, fuel system 40 and fuel source 41, controller 60 and various valves, throttles and actuators, it being understood that all features described with reference to system 10 of FIG. 1 could be provided with system 100 in FIG. 2. System 100 includes an engine 12' with cylinders 12a', 12b', 12c', 12d', 12e', 12f', 12g', 12h', 12i', 12j', 12k', and 12l'. It should be appreciated that while 12 cylinders are illustrated for engine 12' and 8 cylinders are illustrated for engine 12, more or fewer cylinders for either engine embodiment can be provided.

Engine 12' includes at least two cylinder bank 34a, 34b and each cylinder bank 34a, 34b is divided into at least two cylinder subsets including two or more cylinders 12a'-12l' in each cylinder subset. In the illustrated embodiment, first cylinder bank 34a includes a first intake manifold portion associated with a first cylinder subset 122a and a third intake manifold portion associated with a third cylinder subset 122c, and second cylinder bank 34b includes a second intake manifold portion associated with a second cylinder subset 122b and a fourth intake manifold portion associated with a fourth cylinder subset 122d. Each cylinder subset includes three of the cylinders 12a'-12l', although embodiments with two cylinders or four or more cylinders in each subset are contemplated. In addition, while two subsets are shown for two cylinder banks, more than two subsets could be provided, and more than two subsets per cylinder bank could be provided. In still other embodiments, the number of cylinders in the subsets could vary from one subset to the other.

Each cylinder subset 122a, 122c is connected with intake conduit 20a via a respective intake conduit portion 120a, 120c that includes an intake air throttle 159a, 159c, respectively. Each cylinder subset 122b, 122d is connected with intake conduit 20b via a respective intake conduit portion 120b, 120d that includes an intake air throttle 159b, 159d, respectively. Each cylinder subset 122a, 122b, 122c, 122d is further connected to gaseous fuel source 41 with a respective central point injector 121a, 121b, 121c, 121d to selectively provide gaseous fuel flow to the associated cylinders 12a'-12l' of the connected cylinder subset.

In the FIG. 2 embodiment, controller 60 can be configured to cutout fuelling to an entire cylinder bank 34a, 34b, or to cutout fuelling to a specific cylinder subset, or to multiple subsets 122a, 122b, 122c, 122d. It shall be appreciated that cylinder banks may be structurally separate as in the case of V engines or W engines in which separate portions of an engine block have groups of cylinders and that subsets of cylinders within a common portion of an engine block may likewise be considered engine banks regardless of their physical separation or commonality among portions of an engine block. Accordingly, as discussed above, fuelling can be cutout for light load operations and/or thermal management of an aftertreatment system of the fuelled cylinder subset(s), and gas substitution rates can be increased for the fuelled cylinder subset(s) at low or light load conditions. In dual fuel engines featuring pilot ignited diesel injection, there is a required minimum amount of diesel fuel flowing through the injector for injector tip cooling purposes. Under light load conditions, three of the four cylinder subsets could be disabled and significantly increase the gas substitution capability of the cylinder subset that is receiving fuelling. Thus, in this specific scenario, a 75% reduction in the minimum required diesel fueling quantity for the entire engine is obtained, allowing for increased gas substitution when running lighter duty cycles as compared to when all cylinders are receiving fuelling to meet the same torque request.

Figure 3:
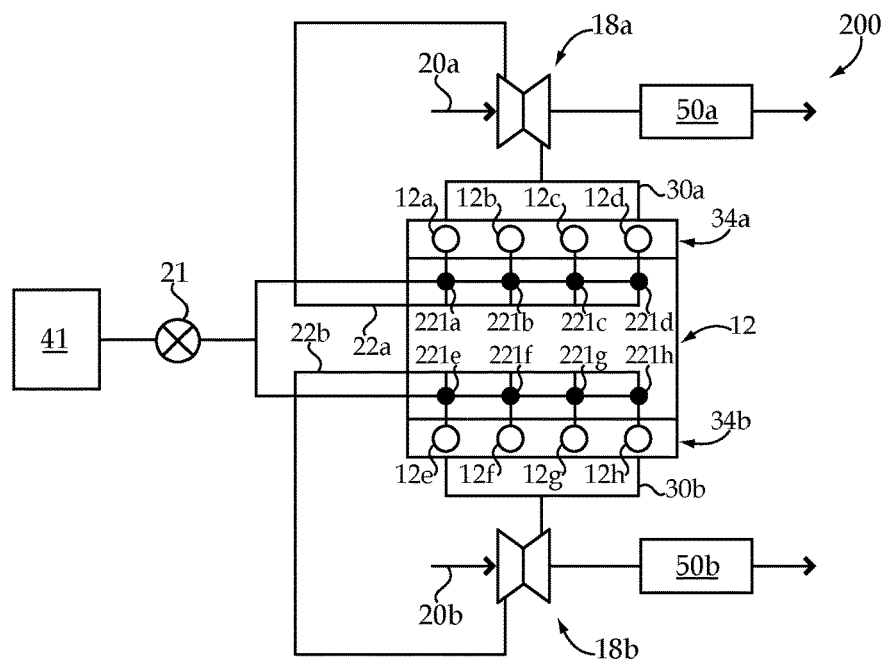
FIG. 3 is a schematic diagram illustrating certain aspects of another exemplary dual fuel engine system.

FIG. 3 illustrates another embodiment dual fuel internal combustion engine system 200. System 200 is similar to system 10, and like components are designated with similar reference numerals. System 200 differs from system 10 in that each cylinder 12a-12h includes a port injector 221a, 221b, 221c, 221d, 221e, 221f, 221g, 221h connected to gaseous fuel source 41 with a single gas control valve 21. In this embodiment, in response to a fuel cutout condition, gaseous fuel flow is first selectively cutout to any one or more cylinders 12a-12h by controller 60 controlling the corresponding port injector(s) 221a-221h, while liquid fuelling to the targeted cutout cylinders is maintained with direct injectors 13a-13h for a time period sufficient to purge the gaseous fuel in the intake of the cylinders targeted for fuel cutout. Then the liquid fuelling is cutout to the one or more targeted cylinders 12a-12h and the remaining cylinders 12a-12h are fuelled to meet the torque request and aftertreatment thermal management requirements.

Referring back to FIG. 1, with it being understood that the following discussion is also applicable to systems 100, 200, controller 60 can be connected to one or more sensors 66a, 66b of aftertreatment systems 50a, 50b to receive signals indicative of operating parameters of the aftertreatment systems 50a, 50b. An example operating parameter includes a temperature of the exhaust gas and/or one or more components of aftertreatment systems 50a, 50b. Another example operating parameter includes one or more exhaust gas constituents at any one or more locations along aftertreatment system 50a, 50b or in exhaust conduit 32a, 32b. Example exhaust gas constituents include NOx, NO, $NO_2$, and/or $NH_3$ added by a reductant injection system in response to reductant injection commands from controller 60. Controller 60 is further operable to produce an exhaust throttle control signal to control the position of the exhaust throttles 46a, 46b and/or intake throttles 59a, 59b or intake throttles 159a, 159b, 159c, 159d between on-off or open-closed positions. The positions of the exhaust throttles 46a, 46b and/or intake throttles 59a, 59b or intake throttles 159a, 159b, 159c, 159d change a flow rate of exhaust gas into the respective aftertreatment system 50a, 50b and thus, in certain operating conditions, can be manipulated to control the temperature of the exhaust gas exiting the respective cylinder banks 34a, 34b. Therefore, the pressure drop across one of the respective cylinder banks 34a, 34b can be controlled, as discussed further below, to increase the operating temperature of the respective aftertreatment system 50a, 50b by closing the respective exhaust throttle 46a, 46b and/or intake throttles 59a, 59b or intake throttles 159a, 159b, 159c, 159d to respond to thermal management requirements for one aftertreatment system while cylinder banks 34a, 34b are differentially fuelled to produce a target temperature condition in the thermally managed aftertreatment system and to satisfy the torque request from the operator.

For a nominal combustion mode of operation of cylinders 12a-12h, exhaust throttles 46a, 46b are both open and controller 60 determines an appropriate amount of fueling to each cylinder bank 34a, 34b as a function of the engine speed signal from engine speed sensor 64 as well as one or more other parameters such as a torque request; and generates corresponding fueling command output signals, with appropriate timing relative to ignition, using techniques known to those skilled in the art. For operations in a fuel cutout mode, controller 60 may also determine an appropriate timing and duration for opening and closing of exhaust valves of cylinders 12a-12d and/or 12e-12h to increase exhaust temperature and aftertreatment system efficiency to obtain a desired target temperature condition for the respective aftertreatment system 50a, 50b. Controller 60 also executes logic in the fuel cutout mode to regulate various other aspects of engine operation based on the various sensor inputs available, and to generate corresponding control signals with outputs to control the fuelling amount with liquid fuel and gaseous fuel, and the timing and the opening and closing of exhaust throttles 46a, 46b via actuators 48a, 48b and/or intake throttles 59a, 59b or intake throttles 159a, 159b, 159c, 159d to thermally manage aftertreatment systems 50a, 50b while satisfying a torque request to engine 12.

System 10 includes aftertreatment systems 50a, 50b to provide for aftertreatment of exhaust gases before discharge through a tailpipe. The techniques and systems described herein allow for an increase in fuelling in response to a fuel cutout of one or more cylinder banks 34a, 34b to increase the efficiency of aftertreatment systems 50a, 50b of the other cylinder bank 34a, 34b in response to, for example, a request for regeneration of an aftertreatment component, a request for a HC desorb, a request for reductant deposit removal, a request for an increase in temperature in response to a cold start, low load, low temperature, and/or any other condition or conditions where thermal management of aftertreatment systems 50a, 50b is desired.

The procedures and related descriptions herein provide an illustrative embodiment of managing fuelling cutout operations and aftertreatment system temperatures while operating engine 12 to satisfy a torque request. Operations illustrated are understood to be exemplary only, and operations may be combined or divided, and added or removed, as well as re-ordered in whole or part. Certain operations illustrated may be implemented by a computer such as controller 60 executing a computer program product on a computer readable medium, where the computer program product comprises instructions causing the computer to execute one or more of the operations, or to issue commands to other devices to execute one or more of the operations.

The procedures herein include an operation to evaluate a load on engine 12 to determine an engine fuelling cutout event. The evaluation of the engine load can be made by, for example, referring to a torque map in response to an engine speed and fuelling amount to cylinders 12a-12h, by a load sensor, by a calculation in response to evaluation of one or more system operating parameters, or any other suitable technique. The procedure further includes determining if the engine load is less than a fuel cutout threshold. The fuel cutout threshold can be, for example, a moderate engine load, low engine load, or range of low to moderate engine loads depending on current operating conditions, such that cutting off fuel to a cylinder bank(s) or cylinder subset(s) will not prevent engine 12 from being operable to satisfy a current or anticipated torque request by operating one or more other cylinder bank(s) or cylinder subset(s). A moderate or low load condition can be defined by any suitable means, such as a load condition that is less than a threshold percentage of a full load condition, less than a threshold torque value, or less than any suitable threshold value that is predetermined or varies in response to current and/or anticipated operating conditions. If a fuel cutout event is detected, the gaseous fuel is first cutout to the targeted cylinder bank(s) or targets cylinder subset(s) or targeted cylinder(s) while liquid fuelling continues for a time period sufficient to purge gaseous fuel from the intake system of the cutout cylinders. Liquid fuelling is then cutout to the target cylinder bank(s) or cylinder subset(s) or cylinder(s) and the remaining cylinder bank(s) or cylinder subset(s) or cylinder(s) are fuelled with liquid fuel and gaseous fuel at an increased substitution rate to meet the torque demand.

Figure 4:
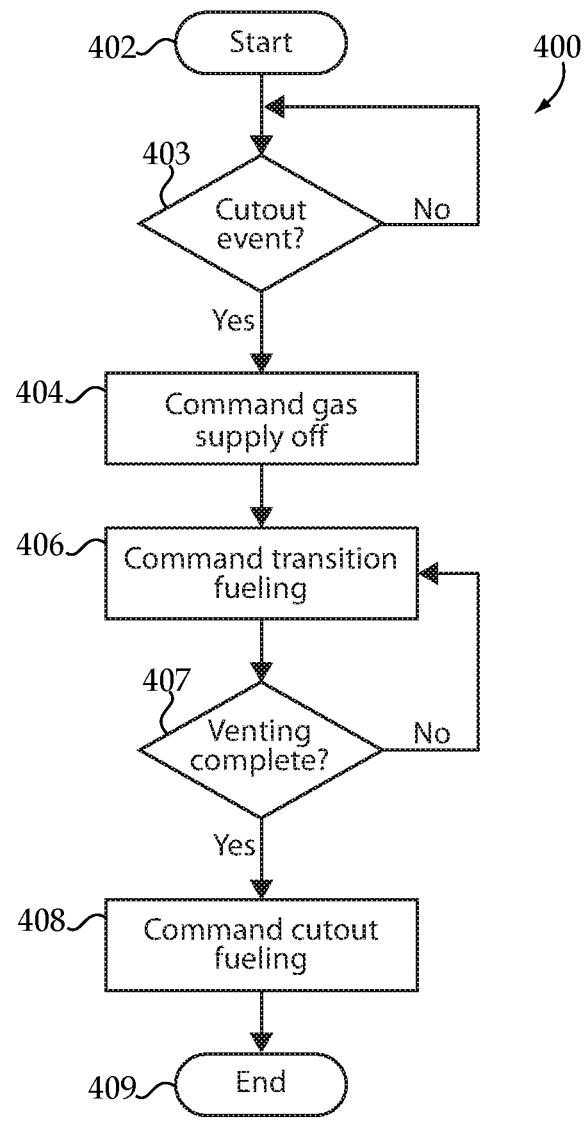
FIG. 4 is a flow diagram illustrating an exemplary control process.

FIG. 4 depicts a flow diagram illustrating an exemplary control process 400. It shall be appreciated that control process 400 may be implemented in and/or executed by one or more controllers of an electronic control system, for example, the controllers described above in connection with FIGS. 1-3 or other types of controllers. Control process 400 begins at start operation 402 and proceeds to conditional 403 which evaluates whether a cylinder cutout condition or opportunity exists. It shall be appreciated that conditional 403 is may be provided in a variety of forms which evaluate the need, value, and/or opportunity to enter a cutout mode of engine operation in which one or more cylinder banks transitions to zero-fueling cutout operation. The evaluation may consider a number of different factors including, for example, aftertreatment temperatures and/or engine operating conditions such as engine load, as well as the factors described above in connection with FIGS. 1-3. If the evaluation indicates that a cylinder cutout opportunity does not exist, conditional 403 repeats. If the evaluation indicates that a cylinder cutout opportunity exists, control process 400 proceeds to operation 404.

Operation 404 executes a gas supply off command. In certain embodiments operation 404 executes a command to initiate the closing of a gas control valve (GCV) that is structured to provide gaseous fuel to one or more targeted cylinder banks. It shall be appreciated that various other devices such as those disclosed herein may also be commanded to shut off or interrupt a supply of gaseous fuel to targeted cylinder bank(s). From operation 404 control process 400 proceeds to operation 406.

Operation 406 commands transition fueling for the targeted cylinder bank(s). As the gas supply diminishes, the diesel fuel controls associated with the targeted cylinder bank(s) will adjust at least one of diesel fueling quantity and/or timing in order to maintain commanded engine operating conditions. During such transition fueling, the dual fuel controls associated with the non-targeted cylinder bank(s) maintain dual fuel operation in order to maintain commanded engine operating conditions. It shall be appreciated that distinct controls may be operated to concurrently control combustion in the targeted cylinder bank(s) and the non-targeted cylinder bank(s) in a transition fueling condition. From operation 406, control process 400 proceeds to conditional 407.

Conditional 407 evaluates whether venting of the targeted cylinder bank(s) has been completed. As a result of executing operation 406, the targeted cylinders bank(s) transition to diesel-only fueling mode, and run in diesel-only mode for a period of time sufficient to allow for the purging/ventilation of any residual gaseous fuel in the intake manifold. The evaluation performed by conditional 407 may consider a number of factors including, for example, a time threshold, the number of engine revolutions needed to cycle the volume of the intake system through the exhaust aftertreatment system, or other factors relevant to evaluating whether ventilation is complete. From conditional 407, control process 400 proceeds to operation 408.

Operation 408 commands cutout fueling operation in which the diesel fueling for the targeted cylinder bank(s) is reduced to zero along with a corresponding increase of diesel fueling in the other bank of cylinders. Once the targeted cylinder bank(s) are disabled, control process 400 can further involve the closing of an intake throttle, opening of a turbo wastegate, and/or the utilization of variable valve actuation to limit the airflow through the exhaust system and/or increase engine pumping work/load.

It shall be appreciated that control process 400 provides one example of a cylinder bank cutout technique that enables higher gas substitution rates at light and/or part-load conditions which would otherwise dictate diesel-only fueling operation. These techniques allow higher exhaust gas temperatures under light-load or part-load engine conditions resulting from higher fueling rates in operating cylinders, increased gas substitution under light-load or part-load conditions resulting from reduced overall (i.e. total) minimum diesel injection requirements, and faster exhaust system warm-up under cold-start conditions among other benefits.

Additional aspects of a number of exemplary embodiments shall now be described. One exemplary embodiment is a method comprising operating a dual fuel internal combustion engine system including an engine with at least two cylinder banks each including at least one cylinder for receiving a liquid fuel and a gaseous fuel from a fuel system, an intake system for delivering air to each of the cylinders, and an exhaust system including a first aftertreatment system for receiving exhaust gases from the first cylinder bank and a second aftertreatment system for receiving exhaust gases from the second cylinder bank; evaluating a fuel cutout event for at least one of the cylinder banks; in response to the fuel cutout event, terminating a gaseous fuelling of the at least one cylinder bank and subsequently fuelling the at least one cylinder bank with a liquid fuel for a time period; and terminating the liquid fuelling of the at least one cylinder bank after the time period while providing liquid fuelling and gaseous fuelling to the remaining cylinder banks to satisfy a torque demand of the engine.

In certain forms of the foregoing method each of the at least two cylinder banks is connected with a corresponding intake conduit and each intake conduit includes a gas control valve to control a gaseous fuel flow to the respective cylinder bank. In certain forms each of the at least two cylinder banks includes at least two cylinder subsets, and each cylinder subset includes at least two cylinders. In certain forms each cylinder subset includes an intake portion and further comprising an injector connected to each intake portion, wherein each injector is connected to a gaseous fuel source. In certain forms each cylinder includes an intake port and each intake port includes a port injector connected to a gaseous fuel source. In certain forms the fuel cutout event includes a low load condition for the engine.

Another exemplary embodiment is an internal combustion engine system, comprising: an engine with a plurality of cylinders, the plurality of cylinders defining at least a first cylinder bank and a second cylinder bank each configured to produce an output torque; a fuel system including a liquid fuel source and a gaseous fuel source, wherein the fuel system is configured to differentially fuel the first cylinder bank and the second cylinder bank with each of the liquid fuel source and the gaseous fuel source; an intake system configured to provide air flow to the plurality of cylinders; an exhaust system including a first exhaust flow path connected to the first cylinder bank to receive a first exhaust flow from the first cylinder bank and a second exhaust flow path connected to the second cylinder bank to receive a second exhaust flow from the second cylinder bank, the first exhaust flow path including a first aftertreatment system and the second exhaust flow path including a second aftertreatment system; a sensor operable to provide a signal indicative of a load condition of the internal combustion engine associated with a fuel cutout event; and a controller coupled to the sensor, the fuel system, and the engine, the controller being operable in response to the signal indicating the fuel cutout event to control the fuel system to first cutout gaseous fuel and then cutout liquid fuel to the second cylinder bank during the fuel cutout event while fuelling the first cylinder bank with liquid fuel and gaseous fuel to meet a torque request.

In certain forms of the foregoing system each of the first and second cylinder banks includes at least two cylinder subsets, and wherein the fuel system is configured so each of the cylinder subsets can be differentially fuelled relative to one another with gaseous fuel from the gaseous fuel source. In certain forms each cylinder includes a port fuel injector connected to the gaseous fuel source and a direct injector connected to the liquid fuel source.

Another exemplary embodiment is a method of controlling a dual fuel internal combustion engine system including at least two cylinder subsets each including at least one cylinder structured to selectably receive liquid fuel and gaseous fuel from a fuel system, the method comprising: operating the engine system in a dual fuel mode in which the two cylinder subsets receive and combust liquid fuel and gaseous fuel; evaluating whether to initiate a fuel cutout for targeted cylinders of the two cylinder subsets; in response to the evaluating, commanding shutoff of a gaseous fuel supply to the targeted cylinders, and subsequently continuing to provide liquid fuel the targeted cylinders until a gaseous fuel ventilation criterion is satisfied; and after satisfaction of the gaseous fuel ventilation criterion, ending liquid fuelling of the targeted cylinders and contemporaneously maintaining dual fuel combustion by the non-targeted cylinders to satisfy a output demand of the engine.

In certain forms of the foregoing method the act of evaluating includes evaluating a temperature associated with an exhaust aftertreatment system operatively coupled with the dual fuel internal combustion system relative to a minimum temperature threshold. Certain forms comprise maintaining dual fuel combustion in the non-targeted cylinders contemporaneous with the act of continuing to provide liquid fuel the targeted cylinders. In certain forms the act of evaluating includes evaluating a load of the dual fuel internal combustion system. In certain forms the exhaust system includes a first aftertreatment system for receiving exhaust gases from the first cylinder subsets and a second aftertreatment system for receiving exhaust gases from the second cylinder subsets.

Another exemplary embodiment is a system comprising: a dual fuel internal combustion engine system including at least two cylinder subsets each including at least one cylinder structured to selectably receive liquid fuel and gaseous fuel from a fuel system; a controller in operative communication with the dual fuel internal combustion engine system and the fuel system, the controller being structured to execute instructions stored in a non-transitory computer-readable medium to operate the engine system and the fuel system in a dual fuel mode in which the two cylinder subsets receive and combust liquid fuel and gaseous fuel, evaluate whether to end fueling to a targeted cylinder subsets of the two cylinder subsets, command shutoff of a gaseous fuel supply to the targeted cylinder subsets and thereafter continue liquid fueling to the targeted cylinder subsets until a ventilation criterion is satisfied, and after the ventilation criterion is satisfied, stop liquid fuelling of the targeted cylinder subsets and maintain dual fuel combustion by the non-targeted cylinder subsets to satisfy a output demand of the engine. In certain forms the controller is structured to evaluate whether to end fueling to the targeted cylinder subsets by evaluating a load on the engine. In certain forms the controller is structured to end fueling to the targeted cylinder subsets if the load on the engine is below a threshold.

Certain forms comprise an exhaust system including a first aftertreatment system for receiving exhaust gases from the first cylinder subsets and a second aftertreatment system for receiving exhaust gases from the second cylinder subsets. In certain forms the controller is structured to end fueling to the targeted cylinder subsets using an evaluation of a temperature of the first aftertreatment system and a temperature of the second aftertreatment system. In certain forms the controller is structured to end fueling to the targeted cylinder subsets if one of the temperature of the first aftertreatment system and the temperature of the second aftertreatment system is below a threshold.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
operating a dual fuel internal combustion engine system including an engine with at least two cylinder banks each including at least one cylinder for receiving a liquid fuel and a gaseous fuel from a fuel system, an intake system for delivering air to each of the cylinders, and an exhaust system including a first aftertreatment system for receiving exhaust gases from the first cylinder bank and a second aftertreatment system for receiving exhaust gases from the second cylinder bank;
evaluating a fuel cutout event for at least one of the cylinder banks;
in response to the fuel cutout event, terminating a gaseous fueling of the at least one cylinder bank and subsequently fueling the at least one cylinder bank with a liquid fuel for a time period; and
terminating the liquid fueling of the at least one cylinder bank after the time period while providing liquid fueling and gaseous fueling to the remaining cylinder banks to satisfy a torque demand of the engine.

2. The method of claim 1, wherein each of the at least two cylinder banks is connected with a corresponding intake conduit and each intake conduit includes a gas control valve to control a gaseous fuel flow to the respective cylinder bank.

3. The method of claim 1, wherein each of the at least two cylinder banks includes at least two cylinder subsets, and each cylinder subset includes at least two cylinders.

4. The method of claim 3, wherein each cylinder subset includes an intake portion and further comprising an injector connected to each intake portion, wherein each injector is connected to a gaseous fuel source.

5. The method of claim 1, wherein each cylinder includes an intake port and each intake port includes a port injector connected to a gaseous fuel source.

6. The method of claim 1, wherein the fuel cutout event includes a low load condition for the engine.

7. An internal combustion engine system, comprising:
an engine with a plurality of cylinders, the plurality of cylinders defining at least a first cylinder bank and a second cylinder bank each configured to produce an output torque;
a fuel system including a liquid fuel source and a gaseous fuel source, wherein the fuel system is configured to differentially fuel the first cylinder bank and the second cylinder bank with each of the liquid fuel source and the gaseous fuel source;
an intake system configured to provide air flow to the plurality of cylinders;
an exhaust system including a first exhaust flow path connected to the first cylinder bank to receive a first exhaust flow from the first cylinder bank and a second exhaust flow path connected to the second cylinder bank to receive a second exhaust flow from the second cylinder bank, the first exhaust flow path including a first aftertreatment system and the second exhaust flow path including a second aftertreatment system;
a sensor operable to provide a signal indicative of a load condition of the internal combustion engine associated with a fuel cutout event; and
a controller coupled to the sensor, the fuel system, and the engine, the controller being operable in response to the signal indicating the fuel cutout event to control the fuel system to first cutout gaseous fuel and then cutout liquid fuel to the second cylinder bank during the fuel cutout event while fueling the first cylinder bank with liquid fuel and gaseous fuel to meet a torque request.

8. The system of claim 7, wherein each of the first and second cylinder banks includes at least two cylinder subsets, and wherein the fuel system is configured so each of the cylinder subsets can be differentially fueled relative to one another with gaseous fuel from the gaseous fuel source.

9. The system of claim 7, wherein each cylinder includes a port fuel injector connected to the gaseous fuel source and a direct injector connected to the liquid fuel source.

10. A method of controlling a dual fuel internal combustion engine system including at least two cylinder subsets each including at least one cylinder structured to selectably receive liquid fuel and gaseous fuel from a fuel system, the method comprising:
operating the engine system in a dual fuel mode in which the two cylinder subsets receive and combust liquid fuel and gaseous fuel;
evaluating whether to initiate a fuel cutout for targeted cylinders of the two cylinder subsets;
in response to the evaluating, commanding shutoff of a gaseous fuel supply to the targeted cylinders, and subsequently continuing to provide liquid fuel to the targeted cylinders until a gaseous fuel ventilation criterion is satisfied; and
after satisfaction of the gaseous fuel ventilation criterion, ending liquid fueling of the targeted cylinders and contemporaneously maintaining dual fuel combustion by the non-targeted cylinders to satisfy a output demand of the engine.

11. The method of claim 10 wherein the act of evaluating includes evaluating a temperature associated with an exhaust aftertreatment system operatively coupled with the dual fuel internal combustion system relative to a minimum temperature threshold.

12. The method of claim 10 comprising maintaining dual fuel combustion in the non-targeted cylinders contemporaneous with the act of continuing to provide liquid fuel the targeted cylinders.

13. The method of claim 10 wherein the act of evaluating includes evaluating a load of the dual fuel internal combustion system.

14. The method of claim 10 wherein the exhaust system includes a first aftertreatment system for receiving exhaust gases from the first cylinder subsets and a second aftertreatment system for receiving exhaust gases from the second cylinder subsets.

15. A system comprising:
a dual fuel internal combustion engine system including at least two cylinder subsets each including at least one cylinder structured to selectably receive liquid fuel and gaseous fuel from a fuel system;
a controller in operative communication with the dual fuel internal combustion engine system and the fuel system, the controller being structured to execute instructions stored in a non-transitory computer-readable medium to
operate the engine system and the fuel system in a dual fuel mode in which the two cylinder subsets receive and combust liquid fuel and gaseous fuel,
evaluate whether to end fueling to a targeted cylinder subsets of the two cylinder subsets,
command shutoff of a gaseous fuel supply to the targeted cylinder subsets and thereafter continue liquid fueling to the targeted cylinder subsets until a ventilation criterion is satisfied, and after the ventilation criterion is satisfied, stop liquid fueling of the targeted cylinder subsets and maintain dual fuel combustion by the non-targeted cylinder subsets to satisfy a output demand of the engine.

16. The system of claim 15 wherein the controller is structured to evaluate whether to end fueling to the targeted cylinder subsets by evaluating a load on the engine.

17. The system of claim 16 wherein the controller is structured to end fueling to the targeted cylinder subsets if the load on the engine is below a threshold.

18. The system of claim 15 comprising an exhaust system including a first aftertreatment system for receiving exhaust gases from the first cylinder subsets and a second aftertreatment system for receiving exhaust gases from the second cylinder subsets.

19. The system of claim 18 wherein the controller is structured to end fueling to the targeted cylinder subsets using an evaluation of a temperature of the first aftertreatment system and a temperature of the second aftertreatment system.

20. The system of claim 19 wherein the controller is structured to end fueling to the targeted cylinder subsets if one of the temperature of the first aftertreatment system and the temperature of the second aftertreatment system is below a threshold.

* * * * *